United States Patent
Vodopyanov

(10) Patent No.: US 6,782,014 B1
(45) Date of Patent: Aug. 24, 2004

(54) LASER WAVELENGTH TRIPLER WITH HIGH QUANTUM EFFICIENCY

(76) Inventor: Konstantin Vodopyanov, 1093 Lenor Way, San Jose, CA (US) 95128

( * ) Notice: Subject to any disclaimer, the term of this patent is extended or adjusted under 35 U.S.C. 154(b) by 235 days.

(21) Appl. No.: 09/967,173

(22) Filed: Sep. 28, 2001

(51) Int. Cl.[7] .................................................. H01S 3/10
(52) U.S. Cl. .......................................... 372/21; 372/22
(58) Field of Search ....................... 372/21–22; 359/330

(56) References Cited

U.S. PATENT DOCUMENTS

| | | | | |
|---|---|---|---|---|
| 5,400,173 A | * | 3/1995 | Komine | 359/330 |
| 5,953,154 A | * | 9/1999 | Akagawa et al. | 359/330 |
| 6,167,067 A | * | 12/2000 | Meyer et al. | 372/21 |
| 6,215,800 B1 | * | 4/2001 | Komine | 372/22 |
| 6,304,583 B1 | * | 10/2001 | Ohmer et al. | 372/21 |
| 6,344,920 B1 | * | 2/2002 | Fukumoto | 372/22 |

* cited by examiner

*Primary Examiner*—Don Wong
*Assistant Examiner*—James Menefee
(74) *Attorney, Agent, or Firm*—Harbart Burkard; John Schipper

(57) ABSTRACT

Method and system for converting a first light beam having a first frequency into a second light beam having a second frequency. A pump photon having (angular) frequency $3\omega$ (or $4\omega$) is provided within an optical cavity, defined by two mirrors that are fully reflecting at a frequency $2\omega$. In a first approach, the pump photon is received and down-converted ($3\omega \rightarrow 2\omega + \omega$) by a first nonlinear crystal, and the $2\omega$ photon is further down-converted ($2\omega \rightarrow \omega + \omega$) by a second nonlinear crystal), to produce three photons ($\omega + \omega + \omega$) that exit from the cavity. In a second approach, the pump photon is received and down-converted ($4\omega \rightarrow 2\omega + 2\omega$) by a first nonlinear crystal, and one or both of the $2\omega$ photons is further down-converted ($2\omega \rightarrow \omega + \omega$) by a second nonlinear crystal).

26 Claims, 2 Drawing Sheets

LASER WAVELENGTH TRIPLER WITH HIGH QUANTUM EFFICIENCY

FIELD OF THE INVENTION

This invention relates to frequency conversion of laser light.

BACKGROUND OF THE INVENTION

In some situations, it is desired to convert the wavelength of a laser beam to one or more higher wavelength values (i.e., introduce a "red shift"), where a coherent light source is needed in a spectral region where a primary source is not available. A red shift may be introduced to minimize optical absorption that would otherwise seriously degrade the intensity of an incident light beam at the lower wavelength, for example, in a nonlinear optical semiconductor crystal. In another situation, introducing a red shift may allow the modified laser beam to hit certain target molecular absorption resonances that are to be studied.

Red shift of laser radiation can be achieved using stimulated Raman scattering (SRS) in gases, liquids or solids, as described by W. Koechner in *Solid State Laser Engineering*, Springer Verlag, Berlin, N.Y., 1988, pp. 526–535. In an SRS system, an incident laser beam having a selected frequency $v0$ interacts with a selected material and a light beam having a Stokes-shifted frequency $v0-\Delta v$ issues from the material, where $\Delta v$ is a frequency difference that is characteristic of the material. A selected wavelength, $\lambda=1.064$ $\mu$m, of an Nd:YAG laser can be converted, using SRS in a medium such as $H_2$, which provides a vibrational wavenumber (difference) $\Delta v'=4155$ cm$^{-1}$, to a resulting wavelength $\lambda=1.91$ $\mu$m radiation, for example.

Red shifting of laser radiation can also be implemented using an optical parametric oscillator (OPO) in which the "pump" laser photon decays into two smaller energy photons, referred to as the "signal" and the "idler." An OPO approach creates coherent light that is red shifted with respect to the original "pump" laser photon.

Using these traditional methods for red shifting laser radiation, it is difficult to achieve high conversion efficiency ($\approx$100 percent) because of the presence of a quantum defect; the red shifted signal photon carries away less energy than was present in the original pump photon. This defect may be especially critical when the frequency of the red shifted signal photon is much less than the frequency of the pump photon.

What is needed is a red shift process that provides more than one red shifted photon, all with approximately the same photon energy. Preferably, this approach should be capable of providing two or three signal photons having substantially the same frequency, where the sum of the energies associated with the photons produced is approximately equal to the pump photon energy.

SUMMARY OF THE INVENTION

These needs are met by the invention, which provides a cascaded frequency down-conversion in which each pump photon produces more than one red-shifted photon. In one embodiment, passage of a pump photon (3ω) through a selected first nonlinear crystal produces a first parametric conversion (3ω2ω+ω); and passage of the resulting 2ω+ω photons through a selected second nonlinear crystal produces a second parametric conversion (2ω+ω→ω+ω+). The first and second nonlinear crystals are aligned within a cavity resonating at frequency 2ω, which is trapped within the cavity until its conversion to ω+ω photons that may exit from the cavity. In another embodiment, the first and second parametric conversion processes are (4ω→2ω+2ω) and (2ω→ω+ω).

DESCRIPTION OF BEST MODES FOR THE INVENTION

Figure 1:
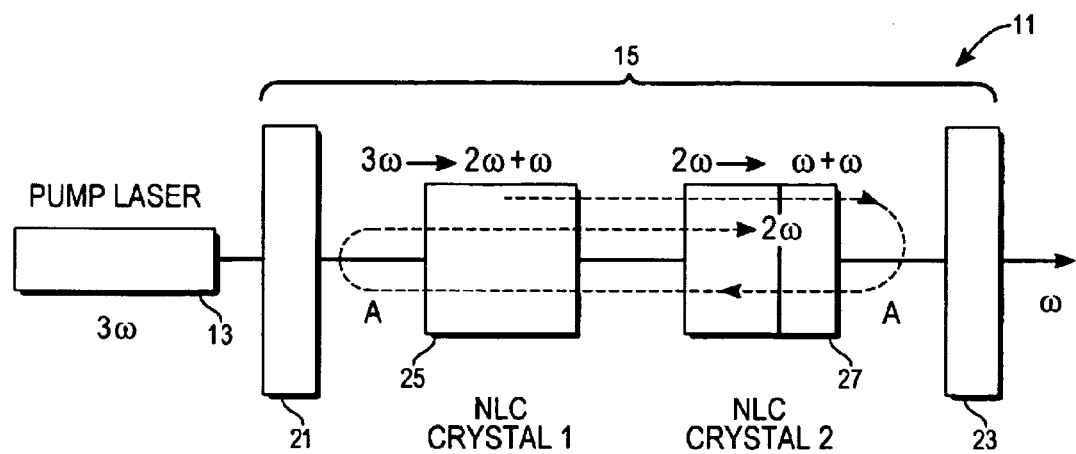
FIGS. 1, 2, 3 and 4 are schematic views of four embodiments of systems for practicing the invention.

FIG. 1 illustrates a first embodiment of a system 11 for practicing the invention. A pump laser beam of photons, having an arbitrarily selected individual associated energies of 3 ℏω, is produced by a pump laser 13 and is directed toward a resonant cavity 15. The resonant cavity 15 includes a first partly transmitting mirror 21, a second partly transmitting mirror 23, spaced apart from each other by a selected distance D, and a first nonlinear crystal 25 and a second nonlinear crystal 27 that are aligned serially between the first and second mirrors as shown. Ideally, each of the first mirror 21 and the second mirror 23 is substantially fully transmitting (80–100 percent) at the (angular) frequencies ω and 3ω and is substantially fully reflective (98–100 percent) at the frequency 2ω. Preferably, the first NLC 25 and of the second NLC 27, have anti-reflective coatings that pass substantially all incident light at the frequency 2ω and at the frequencies ω and 3ω.

The first and second nonlinear crystals (NLCs), 25 and 27, have the respective lengths d(1) and d(2) and have the respective refractive indices n(2ω;1) and n(2ω;2) at the frequency 2ω. Ideally, the distance D satisfies a resonance relation $$\{D+d(1)\cdot(n(2\omega;1)-1)+d(2)\cdot(n(2\omega;2)-1)\}\cdot(2\omega/c)=N2\cdot\pi, \quad (1)$$

where N2 is a selected positive integer. Optionally, the mirrors 21 and 23 are contiguous with ends of the respective NLCs 25 and 27 so that D=d(1)+d(2).

The embodiment illustrated in FIG. 1 relies upon optical parametric oscillation (OPO), which is discussed by A. Yariv in *Optical Electronics in Modern Communications*, Oxford Univ. Press, New York, 1997, pp. 308–322, and in W. Koechner op cit, pp. 519–526. An assembly of pump laser photons with individual energies 3 ℏω is provided by the pump laser 13, is received at and passes through the first mirror 21, and is received at the first NLC 25. The first NLC 25 is configured to convert a pump photon (3ω) to first-converted and second-converted photons (2ω) and ω, respectively) according to the conversion $$3\omega \rightarrow 2\omega+\omega. \quad (2)$$

In practice, a small fraction of the pump photons is not converted on this pass through the first NLC 25 and ultimately passes out of the cavity 15. Substantially all pump photons (3ω) ultimately disappear from within the resonant cavity 15.

The resulting first-converted and second-converted photons (2ω+ω) are received by the second NLC 27, which is configured to convert a first-converted photon (2ω) to two second-converted photons according to the conversion $$2\omega \rightarrow \omega+\omega. \quad (3)$$

Ideally, a pump photon (3ω) passes through the first and second NLCs, 25 and 27, and is converted to three second-converted photons (ω) according to the cascade conversions $$3\omega \rightarrow 2\omega+\omega \rightarrow \omega+\omega+\omega. \quad (4)$$

In practice, a fraction f2 of the second-converted photons is not converted on the first pass through the second NLC 27 and moves approximately parallel to the axis AA of the resonant cavity in one or more cycles. Each of the first and second mirrors is substantially fully reflecting at the frequency $2\omega$ so that the only substantial loss mechanism within the cavity 15 is down conversion according to Eq. (3). Ultimately, substantially all first-converted photons ($2\omega$) are converted to two second-converted photons ($\omega+\omega$).

Substantially all pump photons ($3\omega$) are converted to three second-converted photons ($\omega+\omega+\omega$), according to the conversions in Eq. (4), and pass out of the cavity 15 through the second mirror 23, which is fully transmissive at the frequency $\omega$. One result of this process is that a single pump photon ($3\omega$) is converted to three second-converted photons ($\omega+\omega+\omega$) having substantially equal energies, with a probability reaching about 50 percent, so that the quantum efficiency of conversion can be greater than 100 percent.

Figure 2:
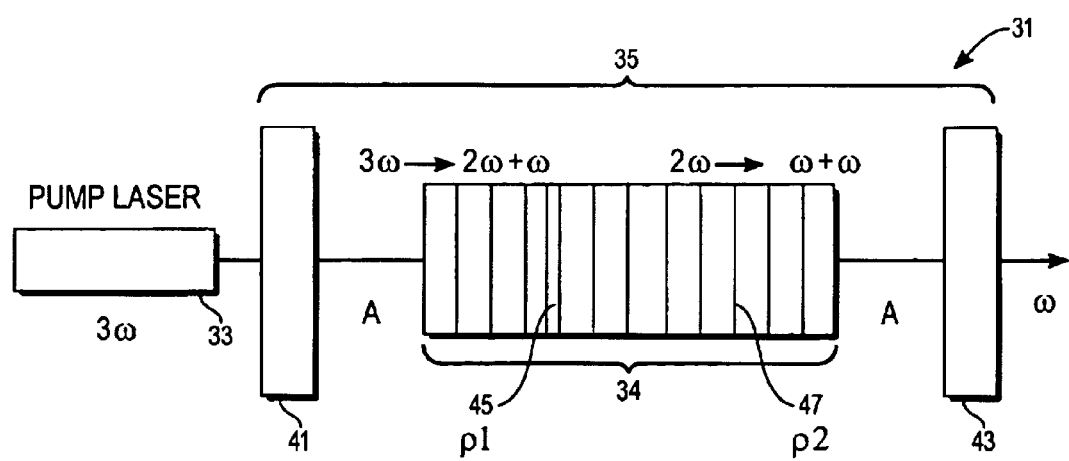

FIG. 2 illustrates a second embodiment of a system 31 for practicing the invention, in which the first and second NLCs of FIG. 1 are replaced by a monolithic, quasi-phase-matched (QPM), periodic grating structure 34, within a resonant cavity 35 that is defined by two partly transmissive mirrors, 35 and 37. Ideally, each of the first mirror 41 and the second mirror 43 is fully transmissive (80–100 percent) at the frequencies $3\omega$ and $\omega$ and is substantially fully reflective (98–100 percent) at the frequency $2\omega$. The QPM grating structure 34 includes first and second cascaded QPM grating structures, 45 and 47, with selected grating periods $p1$ and $p2$, respectively, which are phase matched and configured to promote the photon conversion reactions in Eqs. (2) and (3), respectively, for the pump beam provided by the pump laser beam source 33. Preferably, the first and second QPM grating structures, 45 and 47, are contiguous, not spaced apart from each other. The photon conversion process indicated in Eq. (4) in the system 31 occurs in a manner similar to the photon conversion process in the system 11 in FIG. 1.

The light source, 13 and 33, for the pump laser beam in FIGS. 1 and 2 may be Nd:glass, Nd:YAG, Nd:YAlO$_3$, Nd:YVO$_x$, Ho:YLF, Ti:Al$_2$O$_3$ or any other suitable intense light source. The first and/or second nonlinear crystal may be LiNbO$_3$, LiIO$_3$, KTiOPO$_4$, RbTiOAsO$_4$, CsH$_y$D$_{2-y}$AsO$_4$, β-BaB$_2$O$_4$, Ba$_2$NaNb$_{35}$O$_{15}$, Ag$_2$AsS$_3$, AgGaS$_2$, AgGaSe$_2$, GaAs, ZnGeP$_2$, and any other suitable nonlinear crystal.

Figure 3:
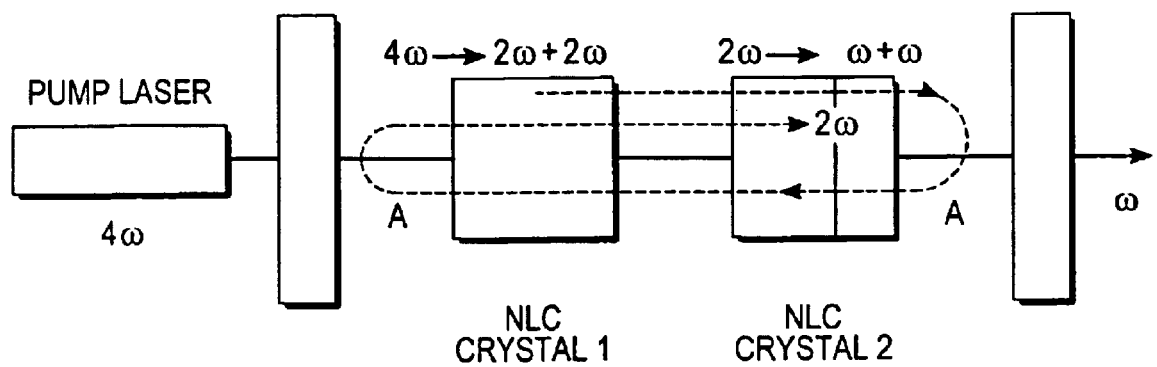
Figure 4:
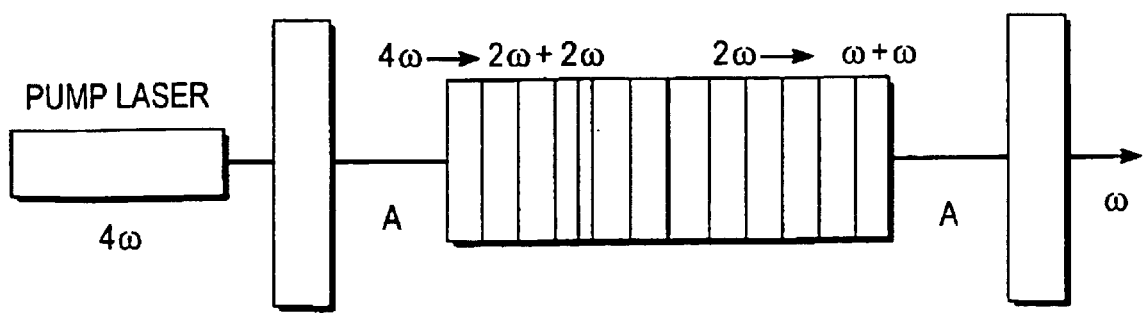

In another embodiment of the invention, the pump laser beam source 13 in FIG. 1 is (re)configured, as illustrated in FIGS. 3 and 4, to provide photons with individual energies $4\hbar\omega$, where $\omega$ is arbitrarily selected, and these photons are received by the cavity 15. The first NLC 25 is (re)configured to convert pump photons ($4\omega$) to first and second first-converted photons according to the conversion process $$4\omega \rightarrow 2\omega+2\omega. \quad (5)$$

Each of the two resulting first-converted photons $2\omega$ is received by the second NLC 27, which is (re)configured to convert a first-converted photon ($2\omega$) to two second-converted photons according to the conversion process $$2\omega \rightarrow \omega+\omega. \quad (6)$$

That is, one or both of the first and second first-converted photons ($2\omega$) provided by the first NLC 25 undergoes the conversion indicated in Eq. (6). The original pump photon ($4\omega$) is thereby converted to three or four resulting photons ($\omega$) according to the cascade conversion process $$4\omega \rightarrow 2\omega+2\omega \rightarrow \omega+\omega+\omega+\omega. \quad (7)$$

Most practical cascade conversion schemes will involve, as part of the process, two consecutive conversion steps that proceed according to Eq. (4) or according to Eq. (7). The first and/or second nonlinear crystal, 25 and/or 27, may be chosen from the same group of nonlinear materials as set forth above, namely LiNbO$_3$, LiIO$_3$, KTiOPO$_4$, RbTiOAsO$_4$, CsH$_y$D$_{2-y}$AsO$_4$, β-BaB$_2$O$_4$, Ba$_2$NaNb$_{35}$O$_{15}$, Ag$_2$AsS$_3$, AgGaS$_2$, AgGaSe$_2$, GaAs, ZnGeP$_2$, and any other suitable nonlinear crystal.

Ideally in this embodiment, each of the first mirror 21 and the second mirror 23 is substantially fully transmitting (80–100 percent) at the (angular) frequencies $\omega$ and $4\omega$ and is substantially fully reflective (98–100 percent) at the frequency $2\omega$. Preferably, the first NLC 25 and the second NLC 27, have anti-reflective coatings that pass substantially all incident light at the frequency $2\omega$ and at the frequencies $\omega$ and $4\omega$. Preferably, the cavity length D again satisfies the resonance relation in Eq. (1).

This cascade conversion approach may also be used for the system 31 shown in FIG. 2, in which the first and second NLCs of FIG. 1 are replaced by a monolithic, quasi-phase-matched (QPM), periodic grating structure 34, within a resonant cavity 35 that is defined by two partly transmissive mirrors, 45 and 47.

What is claimed is:

1. A method for converting a first light beam having a first frequency into a second light beam having a second frequency, the method comprising:

providing an optical cavity that is defined by a cavity axis and first and second mirrors, spaced apart along the axis, and by first and second nonlinear crystals, spaced apart along the axis between the first and second mirrors, wherein each of the first mirror and the second mirror is substantially fully transmitting at each of frequencies $\omega$ and $3\omega$ and is substantially fully reflecting at a frequency $2\omega$, where $\omega$ is a selected frequency;

providing the first nonlinear crystal having a length $d(1)$ and having a refractive index $n(2\omega;1)$ for incident light having said frequency $2\omega$;

providing the second nonlinear crystal having a length $d(2)$ and having a refractive index $n(2\omega;2)$ for incident light having said frequency $2\omega$; and providing the optical cavity with a selected length D that satisfies the relation $\{D+d(1)\cdot(n(2\omega;1)-1)+d(2)\cdot(n(2\omega;2)-1)\}\cdot(2\omega/c)=N2\cdot\pi$, where N2 is a selected positive integer, providing a laser pump beam having pump photons with associated frequency $3\omega$ within the cavity;

allowing at least one pump photon to pass through and interact with a first crystal, positioned within the cavity, and to undergo a conversion to a first-converted photon and a second-converted photon, having substantially the respective frequencies $2\omega$ and $\omega$;

allowing the first-converted photon to pass through and interact with a second crystal, positioned within the cavity, and to undergo a conversion to a third-converted photon and a fourth-converted photon, each having a frequency substantially equal to $\omega$; and allowing the second-converted photon to pass through the second crystal, whereby the pump photon is converted to three photons, each with a frequency substantially equal to $\omega$, each of which exits from the cavity through at least one of the first mirror and the second mirror.

2. The method of claim 1, further comprising providing at least one light-receiving surface of at least one of said first crystal and said second crystal with an anti-reflective coating for said frequency $2\omega$.

3. The method of claim 1, further comprising providing at least one light-receiving surface of at least one of said first crystal and said second crystal with an anti-reflective coating for at least one of said frequencies 3ω and ω.

4. The method of claim 1, further comprising providing said first mirror at a first selected end of said first crystal and providing said second mirror at a second selected end of said second crystal.

5. The method of claim 1, further comprising providing said pump photon from a light source drawn from a group consisting of Nd:glass, Nd:YAG, Nd:YAlO$_3$, Nd:YVO$_x$, Ho:YLF and Ti:Al$_2$O$_3$.

6. The method of claim 1, further comprising providing at least one of said first crystal and said second crystal from a group of crystals consisting of LiNbO$_3$, LiIO$_3$, KTiOPO$_4$, RbTiOAsO$_4$, CsH$_y$D$_{2-y}$AsO$_4$, β-BaB$_2$O$_4$, Ba$_2$NaNb$_{35}$O$_{15}$, Ag$_2$AsS$_3$, AgGaS$_2$, AgGaSe$_2$, GaAs and ZnGeP$_2$.

7. A system for converting a first light beam having a first frequency into a second light beam having a second frequency, the system comprising:

an optical cavity that is defined by a cavity axis and first and second mirrors spaced apart along the axis, and by first and second nonlinear crystals, spaced apart along the axis between the first and second mirrors, wherein each of the first mirror and the second mirror is configured to be substantially fully transmitting at each of frequencies ω and 3ω and to be substantially fully reflecting at a frequency 2ω, where ω is a selected frequency;

a light source that provides a pump laser beam having photons with associated frequency 3ω within the cavity;

a first nonlinear crystal and a second nonlinear crystal, positioned along the axis within the cavity and configured so that:
at least one pump photon passes through and interacts with the first crystal and undergoes a conversion to a first-converted photon and a second-converted photon, having substantially the respective frequencies 2ω and ω;
the first-converted photon passes through and interacts with the second crystal and undergoes a conversion to a third-converted photon and a fourth-converted photon, each having a frequency substantially equal to ω; and
the second-converted photon passes through the second crystal, wherein the first nonlinear crystal has a selected length d(1) and has a refractive index n(2ω;1) for incident light having said frequency 2ω;

wherein the second nonlinear crystal has a selected length d(2) and has a refractive index n(2ω;2) for incident light having said frequency 2ω; and wherein the optical cavity has a selected length D that satisfies the relation {D+d(1)·(n(2ω;1)−1)+d(2)·(n(2ω;2)−1)}·(2ω/c)=N2·π, where N2 is a selected positive integer, whereby the pump photon is converted to three photons, each with a frequency substantially equal to ω, each of which exits from the cavity through at least one of the first mirror and the second mirror.

8. The system of claim 7, wherein at least one light-receiving surface of at least one of said first crystal and said second crystal is coated an anti-reflective coating for said frequency 2ω.

9. The system of claim 7, wherein at least one light-receiving surface of at least one of said first crystal and said second crystal is coated an anti-reflective coating for at least one of said frequencies 3ω and ω.

10. The system of claim 7, wherein said first mirror and said second mirror are positioned at a first selected end of said first crystal and at a second selected end of said second crystal, respectively.

11. The system of claim 7, wherein said light source is drawn from a group consisting of Nd:glass, Nd:YAG, Nd:YAlO$_3$, Nd:YVO$_x$, Ho:YLF and Ti:Al$_2$O$_3$.

12. The system of claim 7, wherein at least one of said first crystal and said second crystal is drawn from a group of crystals consisting of LiNbO$_3$, LiIO$_3$, KTiOPO$_4$, RbTiOAsO$_4$, CsH$_y$D$_{2-y}$AsO$_4$, β-BaB$_2$O$_4$, Ba$_2$NaNb$_{35}$O$_{15}$, Ag$_2$AsS$_3$, AgGaS$_2$, AgGaSe$_2$, GaAs and ZnGeP$_2$.

13. A method for converting a first light beam having a first frequency into a second light beam having a second frequency, the method comprising:

providing an optical cavity that is defined by a cavity axis and first and second mirrors spaced apart along the axis, and by first and second nonlinear crystals, spaced apart along the axis between the first and second mirrors, wherein each of the first mirror and the second mirror is substantially fully transmitting at each of frequencies ω and 4ω and is substantially fully reflecting at a frequency 2ω, where ω is a selected frequency;

providing a laser pump beam having pump photons with associated frequency 4ω within the cavity;

allowing at least one pump photon to pass through and interact with a first crystal and to undergo a conversion to a first-converted photon and a second-converted photon, each having a frequency substantially equal to 2ω;

allowing at least one of the first-converted photon and the second-converted photon to pass through and interact with a second crystal and to undergo a conversion to a third-converted photon and a fourth-converted photon, each of the third-converted and fourth-converted photon having a frequency substantially equal to ω, providing the first nonlinear crystal having a length d(1) and having a refractive index n(2ω;1) for incident light having the frequency 2ω;

providing the second nonlinear crystal having a length d(2) and having a refractive index n(2ω;2) for incident light having the frequency 2ω; and providing the optical cavity with a selected length D that satisfies the relation {D+d(1)·(n(ω;1)−1)+d(2)·(n(2ω;2)−1)}·(2ω/c)=N2·π, where N2 is a selected positive integer, whereby the pump photon is converted to at least two photons, each with a frequency substantially equal to ω, and each of which exits from the cavity through at least one of the first mirror and the second mirror.

14. The method of claim 13, further comprising:

allowing each of said first first-converted photon and said second first-converted photon to pass through and interact with said second crystal, positioned within said cavity, and to undergo a conversion to first and second second-converted photons, each having a frequency substantially equal to ω, whereby the pump photon is converted to at least four photons, each with a frequency substantially equal to ω.

15. The method of claim 13, further comprising providing at least one light-receiving surface of at least one of said first crystal and said second crystal with an anti-reflective coating for said frequency 2ω.

16. The method of claim 13, further comprising providing at least one light-receiving surface of at least one of said first crystal and said second crystal with an anti-reflective coating for at least one of said frequencies 4ω and ω.

17. The method of claim 13, further comprising providing said first mirror at a first selected end of said first crystal and providing said second mirror at a second selected end of said second crystal.

18. The method of claim 13, further comprising providing said pump photon from a light source drawn from a group consisting of Nd:glass, Nd:YAG, Nd:YAlO$_3$, Nd:YVO$_x$, Ho:YLF and Ti:Al$_2$O$_3$.

19. The method of claim 13, further comprising providing said first crystal from a group of crystals consisting of LiNbO$_3$, LiIO$_3$, KTiOPO$_4$, RbTiOAsO$_4$, CsH$_y$D$_{2-y}$AsO$_4$, β-BaB$_2$O$_4$, Ba$_2$NaNb$_{35}$O$_{15}$, Ag$_2$AsS$_3$, AgGaS$_2$, AgGaSe$_2$, GaAs and ZnGeP$_2$.

20. A system for converting a first light beam having a first frequency into a second light beam having a second frequency, the system comprising:
  an optical cavity that is defined by a cavity axis and first and second mirrors spaced apart along the axis, and by first and second nonlinear crystals, spaced apart along the axis between the first and second mirrors, wherein each of the first mirror and the second mirror is substantially fully transmitting at each of frequencies ω and 4ω and is substantially fully reflecting at a frequency 2ω, where ω is a selected frequency;
  a light source that provides a pump laser beam having photons having an associated frequency 4ω within the cavity;
  a first nonlinear crystal and a second nonlinear crystal, positioned along the axis within the cavity and configured so that:
    the pump photon passes through and interacts with the first crystal and undergoes a conversion to a first-converted photon and a second-converted photon, each having a frequency substantially equal to 2ω; and
    at least one of the first-converted photon and the second-converted photon passes through and interacts with the second crystal and undergoes a conversion to a third-converted photon and a fourth-converted photon, each of the third-converted photon and fourth-converted photon having a frequency substantially equal to ω,
  wherein the first nonlinear crystal has a selected length d(1) and has a refractive index n(2ω;1) for incident light having the frequency 2ω;
  wherein the second nonlinear crystal has a selected length d(2) and has a refractive index n(2ω;2) for incident light having the frequency 2ω; and
  wherein the optical cavity has a selected length D that satisfies the relation $\{D+d(1)\cdot(n(2\omega;1)-1)+d(2)\cdot(n(2\omega;2)-1))\}\cdot(2\omega/c)=N2\cdot\pi$,
where N2 is a selected positive integer,
  whereby the pump photon is converted to at least two photons, each with a frequency substantially equal to ω, and each of which exits from the cavity through at least one of the first mirror and the second mirror.

21. The system of claim 20, wherein said first and second nonlinear crystals are configured so that
  each of said first-converted photon and said second-converted photon passes through and interacts with said second crystal and undergoes a conversion to first and second second-converted photons, each having a frequency substantially equal to ω,
  whereby the pump photon is converted to at least four photons, each with a frequency substantially equal to ω.

22. The system of claim 20, wherein at least one light-receiving surface of at least one of said first crystal and said second crystal is coated an anti-reflective coating for said frequency 2ω.

23. The system of claim 20, wherein at least one light-receiving surface of at least one of said first crystal and said second crystal is coated an anti-reflective coating for at least one of said frequencies 4ω and ω.

24. The system of claim 20, wherein said first mirror and said second mirror are positioned at a first selected end of said first crystal and at a second selected end of said second crystal, respectively.

25. The system of claim 20, wherein said light source is drawn from a group consisting of Nd:glass, Nd:YAG, Nd:YAlO$_3$, Nd:YVO$_x$, Ho:YLF and Ti:Al$_2$O$_3$.

26. The system of claim 20, wherein at least one of said first crystal and said second crystal is drawn from a group of crystals consisting of LiNbO$_3$, LiIO$_3$, KTiOPO$_4$, RbTiOAsO$_4$, CsH$_y$D$_{2-y}$AsO$_4$, β-BaB$_2$O$_4$, Ba$_2$NaNb$_{35}$O$_{15}$, Ag$_2$AsS$_3$, AgGaS$_2$, AgGaSe$_2$, GaAs and ZnGeP$_2$.

* * * * *